(12) United States Patent
Dreps et al.

(10) Patent No.: US 8,898,503 B2
(45) Date of Patent: Nov. 25, 2014

(54) LOW LATENCY DATA TRANSFER BETWEEN CLOCK DOMAINS OPERATED IN VARIOUS SYNCHRONIZATION MODES

(71) Applicant: International Business Machines Corporation, Armonk, NY (US)

(72) Inventors: Daniel M. Dreps, Georgetown, TX (US); Frank D. Ferraiolo, Naples, FL (US); Hubert Harrer, Schoenaich (DE); Pak-kin Mak, Poughkeepsie, NY (US); Ching-Lung L. Tong, Highland Mills, NY (US); Tobias Webel, Schwaebisch-Gmuend (DE); Ulrich Weiss, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/073,978

(22) Filed: Nov. 7, 2013

(65) Prior Publication Data

US 2014/0136737 A1    May 15, 2014

(30) Foreign Application Priority Data

Nov. 15, 2012    (GB) .................................. 1220534.0

(51) Int. Cl.
*G06F 1/00*    (2006.01)
*G06F 1/08*    (2006.01)
*G06F 5/16*    (2006.01)
*G06F 5/00*    (2006.01)

(52) U.S. Cl.
CPC ... *G06F 5/16* (2013.01); *G06F 1/08* (2013.01)
USPC ....................................................... 713/501

(58) Field of Classification Search
CPC ............... G06F 5/00; G06F 5/06; G06F 3/00; G06F 2003/00
USPC ................. 713/500–501, 600; 710/52, 58, 61
See application file for complete search history.

(56) References Cited

U.S. PATENT DOCUMENTS 3,894,431 A  *  7/1975  Muston et al. ............. 73/861.29
4,860,322 A     8/1989  Lloyd
(Continued)

FOREIGN PATENT DOCUMENTS

EP          1295134 B1      9/2009

OTHER PUBLICATIONS

Combined Search and Examination Report for GB1319714.0 dated Apr. 24, 2014, pp. 1-6.

(Continued)

*Primary Examiner* — Christopher Shin
(74) *Attorney, Agent, or Firm* — Steven Chiu, Esq.; Blanche E. Schiller, Esq.; Heslin Rothenberg Farley & Mesiti P.C.

(57) ABSTRACT

Transferring data from a first clock domain to a second clock domain, wherein the second clock domain has a fixed clock frequency, and the first clock domain has a variable clock frequency. The first clock domain and the second clock domain operate in a synchronous mode when the variable clock frequency is equal to the fixed clock frequency, and in an asynchronous mode when the variable frequency is lower than the fixed frequency. A first buffer and a second buffer are used for a data transfer from the first clock domain to the second clock domain. The second clock domain comprises a multiplexor connected to the first buffer and the second buffer. The multiplexor forwards data from the first buffer further into the second clock domain in the synchronous mode and from the second buffer into the second clock domain in the asynchronous mode.

20 Claims, 6 Drawing Sheets

(56) References Cited

U.S. PATENT DOCUMENTS

| | | | |
|---|---|---|---|
| 5,774,702 | A | 6/1998 | Mitsuishi et al. |
| 6,724,850 | B1 | 4/2004 | Hartwell |
| 6,738,917 | B2 * | 5/2004 | Hummel et al. ............. 713/400 |
| 6,754,869 | B2 * | 6/2004 | Bucksch et al. ............. 714/744 |
| 6,950,959 | B2 * | 9/2005 | Davies et al. ................ 713/500 |
| 7,487,379 | B2 | 2/2009 | Nguyen et al. |
| 7,640,449 | B2 | 12/2009 | Ham |
| 7,958,285 | B1 | 6/2011 | Chiu et al. |
| 7,975,161 | B2 | 7/2011 | Kahn |
| 8,234,514 | B2 * | 7/2012 | Sargaison et al. ............. 713/600 |
| 8,356,203 | B2 * | 1/2013 | Uchida et al. ................ 713/600 |
| 8,598,910 | B1 | 12/2013 | Leshchuk et al. |
| 2002/0087909 | A1 * | 7/2002 | Hummel et al. ............. 713/400 |
| 2003/0159078 | A1 * | 8/2003 | Davies et al. ................ 713/400 |
| 2005/0069030 | A1 | 3/2005 | Henkel |
| 2007/0038795 | A1 | 2/2007 | Kadomaru |
| 2007/0277052 | A1 * | 11/2007 | Sargaison et al. ............. 713/400 |
| 2010/0122106 | A1 * | 5/2010 | Lee et al. ...................... 713/503 |
| 2010/0281292 | A1 * | 11/2010 | Sargaison et al. ............. 713/600 |
| 2011/0016346 | A1 * | 1/2011 | Lee et al. ...................... 713/503 |
| 2014/0149780 | A1 * | 5/2014 | Daily et al. ................... 713/503 |

OTHER PUBLICATIONS

Fischer et al., "A 90-nm Variable Frequency Clock System for a Power-Managed Itanium Architecture Processor," IEEE Journal of Solid-State Circuits, vol. 41, No. 1, Jan. 2006, pp. 218-228.

* cited by examiner

LOW LATENCY DATA TRANSFER BETWEEN CLOCK DOMAINS OPERATED IN VARIOUS SYNCHRONIZATION MODES

PRIOR FOREIGN APPLICATION

This application claims priority from United Kingdom patent application number 1220534.0, filed Nov. 15, 2012, which is hereby incorporated herein by reference in its entirety.

BACKGROUND

At dawn of the computer era digital computers were made of blocks performing elementary logic functions. The majority of these building blocks were operating at the same clock frequency. Increase in computer performance was achieved by clock frequency increase and development of specialized/dedicated building blocks like memory chips, CPU (Central Processing Unit) chips, I/O (Input/Output) chips etc. Uneven progress in development of different types of chips and/or computer architectural demands resulted in development of computers comprising different chips operating at different clock frequencies. Further development along this trajectory resulted in different clock domains within one chip or even on one die. In return a new problem emerged, i.e. implementation of low latency data transfer between these clock domains. This problem gets further complicated when data has to be transferred between clock domains having a variable clock frequency. For instance, it is a common practice when a CPU clock domain having a variable clock frequency communicates with other devices via an I/O clock domain having a fixed clock frequency. As usual various buffers are used as intermediate storage elements for a data transfer between the clock domains. A state of the art approach is based on utilization of one buffer per data channel connecting the clock domains.

BRIEF SUMMARY

One or more aspects of the present invention provide for embodiments that fill the need of low latency data transfer between clock domains operated at various clock frequencies. It should be appreciated that aspects of the present invention can be implemented in numerous ways, including as a process, an apparatus, a system, or a device.

One embodiment provides a method of data transfer from a first clock domain to a second clock domain. The second clock domain has a fixed clock frequency. The first clock domain has a variable clock frequency not exceeding the fixed clock frequency of the second clock domain. The first clock domain and the second clock domain can be operated in a synchronous mode and in an asynchronous mode. In the synchronous mode the fixed clock frequency of the second clock domain is equal to the variable clock frequency of the first clock domain. In the asynchronous mode the variable frequency of the first clock domain is lower than the fixed frequency of the second clock domain.

A first buffer and a second buffer are used for a data transfer from the first clock domain to the second clock domain. The first buffer and the second buffer are connected in parallel to each other and in series with the first clock domain and the second clock domain. The second clock domain includes a multiplexor connected to the first buffer and the second buffer. The multiplexor is operable to forward data from the first buffer or from the second buffer into the second clock domain. The first buffer has a first delay time for data transfer from the first clock domain to the second clock domain. The second buffer has a second time delay for the data transfer from the first clock domain to the second clock domain. The second delay time is longer than the first delay time.

The multiplexor forwards data from the first buffer into the second clock domain in the synchronous mode of operation and from the second buffer into the second clock domain the asynchronous mode of operation.

BRIEF DESCRIPTION OF THE SEVERAL VIEWS OF THE DRAWINGS

One or more aspects of the present invention will be readily understood by the following detailed description in conjunction with the accompanying drawings.

DETAILED DESCRIPTION

Several exemplary embodiments for a system and a method for a low latency data transfer across different clock domains will now be described. It will be apparent to those skilled in the art that aspects of the present invention may be practiced without some or all of the specific details set forth herein.

As described herein many current computer systems include two or more clock domains having different clock frequencies. These clock domains may be located in one die, or in different dies packaged within one chip, or even in different chips of a computer system. A problem of the low latency data transfer from one clock domain to another clock domain requires a dedicated solution when at least one of the clock domains has a variable clock frequency.

As usual various buffers are used as intermediate storage elements for a data transfer between the clock domains. A state of the art approach is based on utilization of one buffer per data channel connecting the clock domains. One or more aspects of the present invention are based on utilization of at least two buffers connected in parallel to each other for the data transfer between the clock domains, wherein at least one of the clock domains has a variable clock frequency. In this case the clock domains have at least two different synchronization modes. The clock domains can operate in one synchronization mode when clock frequencies of the clock domains are equal and the clock domains can operate in yet another synchronization mode when the clock frequencies are not equal. One of said buffers can be used when the clock domains operate in one of the synchronization modes, yet another one of the buffers can be used when the clock domains operate in yet another one of the synchronization modes. In this case each of the buffers can have a dedicated design and/or optimized settings for each of the synchronization modes in order to provide minimum latency of the data transfer for each of the synchronization modes.

Figure 1:
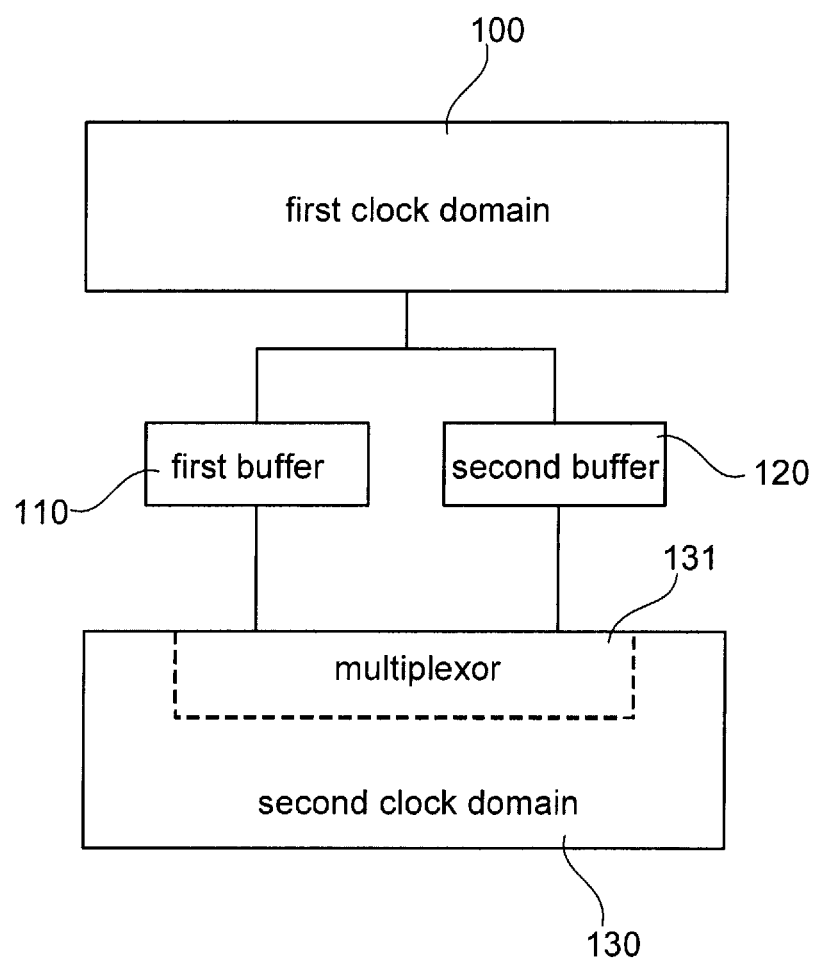
FIG. 1 is a block diagram of a first clock domain and a second clock domain comprising a multiplexor, wherein a first buffer and a second buffer are used for a data transfer from the first clock domain to the second clock domain, in accordance with an embodiment of the present invention.

FIG. 1 illustrates an embodiment of the present invention. A first buffer 110 and a second buffer 120 are used for a data transfer from the first clock domain 100 and a second clock domain 130. The buffers are connected in parallel to each other and in series with the clock domains. The second clock domain 130 includes a multiplexor 131 connected to the buffers and operable to forward data from the first buffer 110 further into the second clock domain 130 or to forward the data from the second buffer 120 further into the second clock domain 130. The first buffer 110 has a first delay time for data transfer from the first clock domain 100 to the second clock domain 130. The second buffer 120 has a second time delay for the data transfer from the first clock domain 100 to the second clock domain 130. The second delay time is longer than the first delay time.

The second clock domain 130 has a fixed clock frequency and the first clock domain 100 has a variable clock frequency not exceeding the fixed clock frequency. The clock domains 100, 130 can be operated in a synchronous mode when the fixed clock frequency is equal to the variable clock frequency. The clock domains 100, 130 can be operated in an asynchronous mode when the fixed clock frequency is greater than the variable clock frequency.

Figure 2:
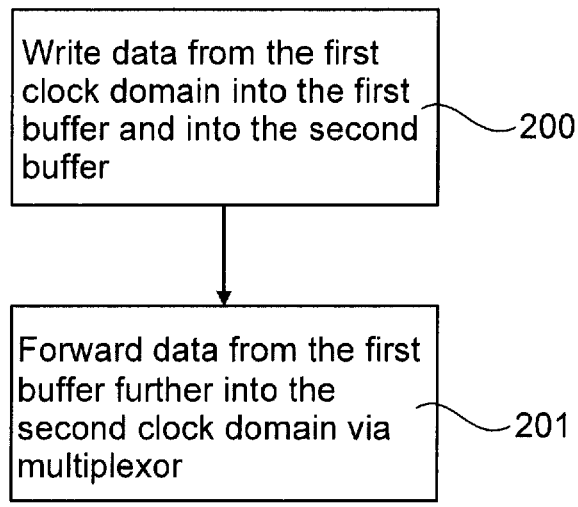
FIG. 2 is a flowchart of the operations for the data transfer from the first clock domain into the second clock domain in a synchronous mode, in accordance with an embodiment of the present invention.

FIG. 2 is a flow chart of operations 200, 201 for the data transfer from the first clock domain 100 to the second clock domain 130 in the synchronous mode. In an operation 200 the data from the first clock domain 100 is written into the first buffer 110 and the second buffer 120. In an operation 201 the data from the first buffer 110 is forwarded further into the second clock domain 130 via the multiplexor 131.

Figure 3:
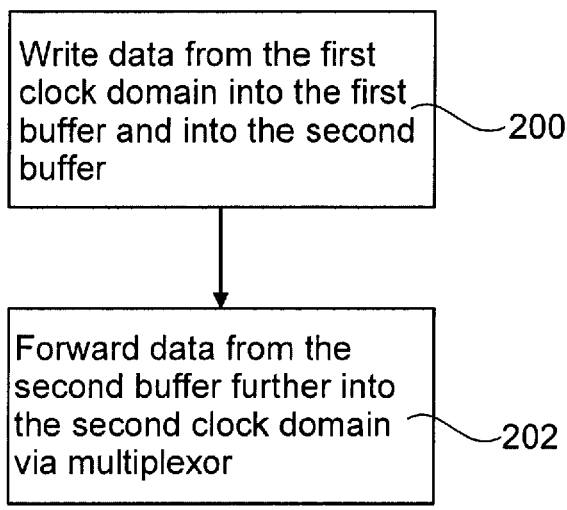
FIG. 3 is a flowchart of the operations for the data transfer from the first clock domain into the second clock domain in an asynchronous mode, in accordance with an embodiment of the present invention.

FIG. 3 is a flow chart of operations 200, 202 for the data transfer from the first clock domain 100 to the second clock domain 130 in the asynchronous mode. In an operation 200 the data from the first clock domain 100 is written into the first buffer 110 and the second buffer 120. In an operation 202 the data from the second buffer 120 is forwarded further into the second clock domain 130 via the multiplexor 131.

Those skilled in the art will clearly understand that the aspects of present embodiment can be further extended to a scheme comprising any arbitrary number of buffers having various delay times for the data transfer from the first clock domain to the second clock domain. The buffers are connected in parallel to each other and in series to the first clock domain and the multiplexor of the second clock domain. The first clock domain can have the first variable clock frequency and the second clock domain can have a second variable clock frequency. The multiplexor can forward the data from one of the buffers further into the second clock domain depending on a value of a first variable clock frequency and/or the value of the second variable clock frequency.

A type of the first buffer can be, but not limited to, a first-in first-out type buffer. The type of the second buffer can be, but not limited to, the first-in first-out type buffer.

Figure 4:
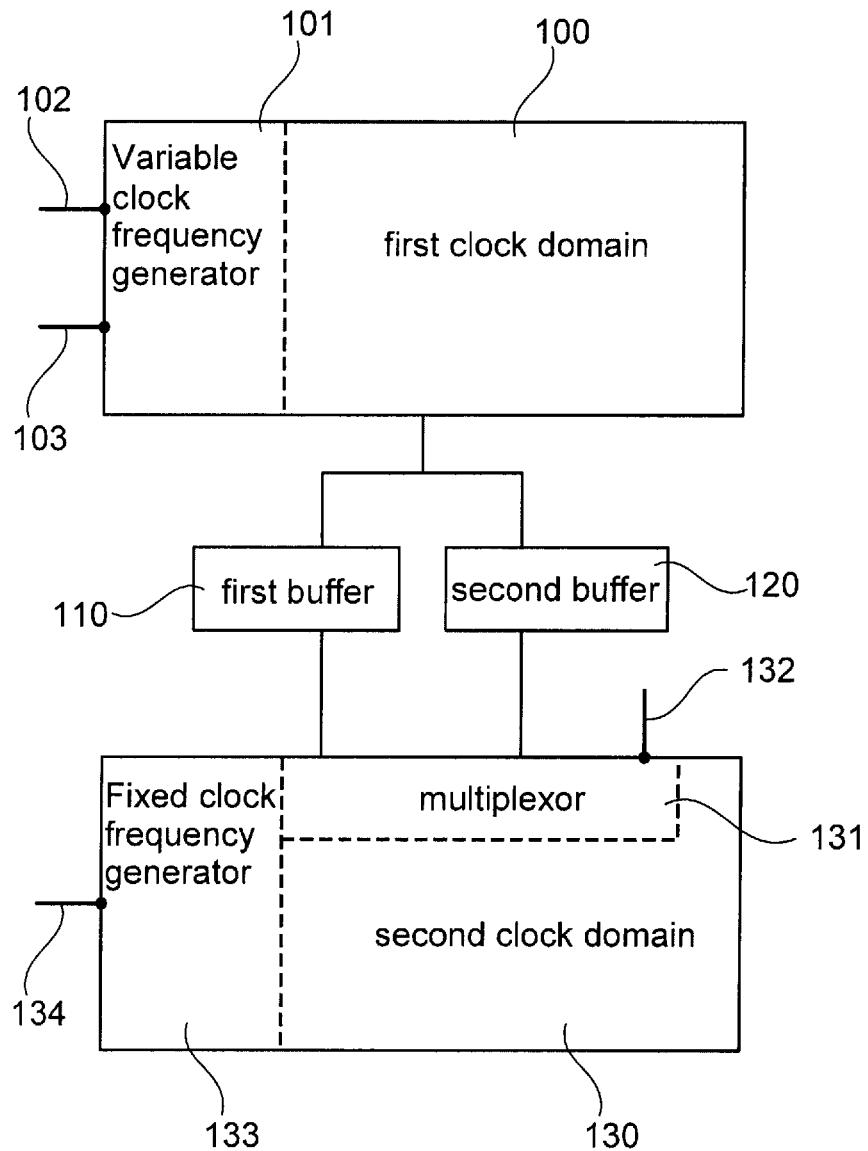
FIG. 4 is a block diagram of the first clock domain comprising a variable clock frequency generator and the second clock domain comprising a fixed clock frequency generator and the multiplexor, wherein a first buffer and a second buffer are used for a data transfer from the first clock domain to the second clock domain, in accordance with an embodiment of the present invention.

FIG. 4 illustrates another embodiment of the present invention. A first buffer 110 and a second buffer 120 are used for the data transfer from the first clock domain 100 to the second clock domain 130. The first buffer 110 and the second buffer 120 are connected in parallel to each other and in series with the first clock domain 100 and the second clock domain 130. The second clock domain includes a multiplexor 131 connected to the first buffer 110 and the second buffer 120. The multiplexor is operable to forward data from the first buffer 110 or from the second buffer 120 further into the second clock domain 130. The first buffer 110 has a first delay time for data transfer from the first clock domain 100 to the second clock domain 130. The second buffer 120 has a second time delay for the data transfer from the first clock domain 100 to the second clock domain 130. The second delay time is longer than the first delay time.

The multiplexor 131 forwards data from the first buffer 110 further into the second clock domain 130 in the synchronous mode and from the second buffer 120 into the second clock domain 130 in the asynchronous mode.

The multiplexor 131 has a mux input port for receiving a first mux command to forward the data from the first buffer 110 further into the second clock domain 130 and a second mux command to forward the data from the second buffer 120 further into the second clock domain 130. The first clock domain includes a first plurality of logic devices 101 for generating the variable clock frequency and a frequency synchronization with the fixed clock frequency in the synchronous mode. The first plurality of logic devices further includes a first sync on/off input port 102 for receiving a first sync on command to switch on the frequency synchronization with the fixed clock frequency and a first sync off command to switch off the frequency synchronization with the fixed clock frequency. The first plurality of logic devices 101 further includes a set frequency input port 103 for receiving a set frequency command to set the variable frequency to a frequency value. The second clock domain 130 includes a second plurality of logic devices 133 for generating the fixed frequency and the frequency synchronization with the variable clock frequency in the synchronous mode. The second plurality of logic devices 133 includes a second sync on/off input port 134 for receiving a second sync on command for switching on the frequency synchronization with the variable clock frequency and a second sync off command for switching off the frequency synchronization with the variable clock frequency.

Figure 5:
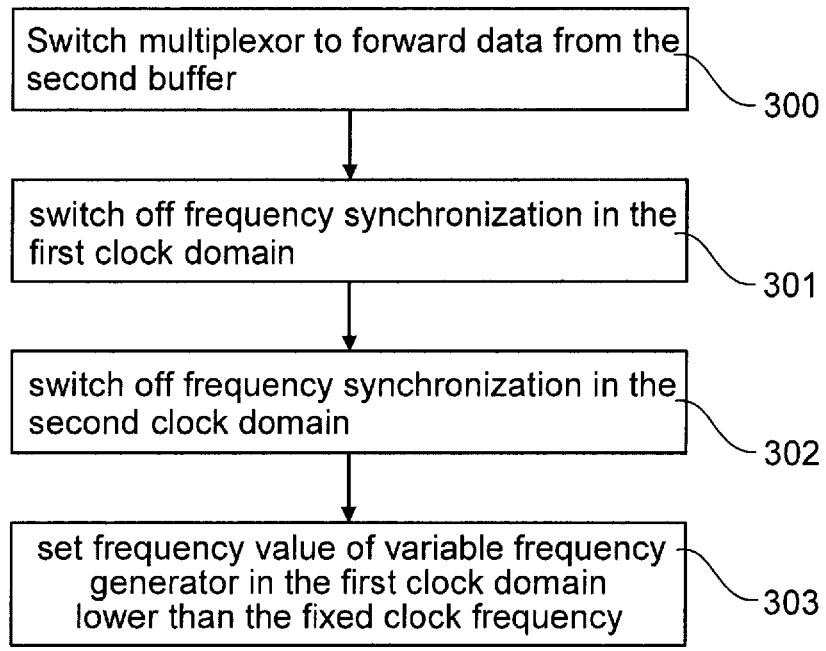
FIG. 5 is a flowchart of the operations for a sync-async transition, in accordance with an embodiment of the present invention.

FIG. 5 is a flow chart of operations 300, 301, 302, 303 for a sync-async transition from the synchronous mode to the asynchronous mode. An operation 300 of switching the multiplexor 131 to forward the data from the second buffer 120 further into the second clock domain 130 includes sending the second mux command via the mux input port 132. An operation 301 of switching off the frequency synchronization in the first clock domain 100 includes sending the first sync off command via the first sync on/off input port 102. An operation 302 of switching off the frequency synchronization in the second clock domain 130 includes sending the second sync off command via the second sync on/off input port 134. An operation 303 of setting the frequency value of a variable frequency generator in the first clock domain 100 lower than the fixed clock frequency includes sending the set frequency command via the set frequency input port 103, wherein the frequency value is lower than the fixed clock frequency.

Those skilled in the art will clearly understand that the sequence of an execution of the operations 301 and 302 is not a principle. The operation 302 can be executed prior the operation 301 or simultaneously with the operation 301.

Figure 6:
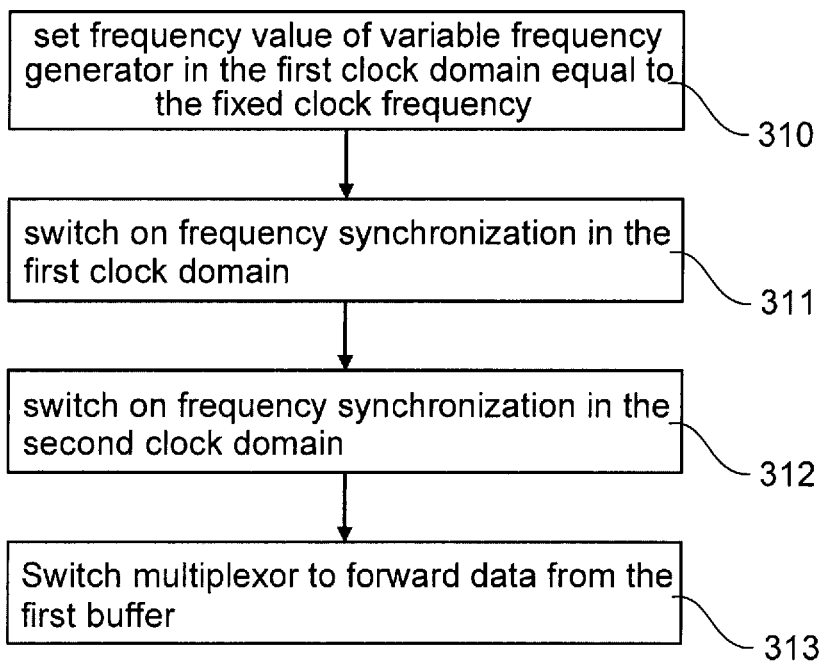
FIG. 6 is a flowchart of the operations for an async-sync transition, in accordance with an embodiment of the present invention.

FIG. 6 is a flow chart of operations 310, 311, 312, 313 for an async-sync transition from the asynchronous mode to the synchronous mode. An operation 310 of setting the frequency value of the variable frequency generator in the first clock domain 100 equal to the clock frequency domain includes sending the set frequency command via the set frequency input port 103, wherein the frequency value is equal to the fixed clock frequency. An operation 311 of switching on the frequency synchronization in the first clock domain 100 includes sending the first sync on command via the first sync on/off input port 102. An operation 312 of switching on the frequency synchronization in the second clock domain 130 includes sending the second sync on command via the second sync on/off input port 134. An operation 313 switches the multiplexor to forward data from the first buffer.

Those skilled in the art will clearly understand that the sequence of an execution of the operations 311 and 312 is not a principle. The operation 312 can be executed prior the operation 311 or simultaneously with the operation 311.

Figure 7:
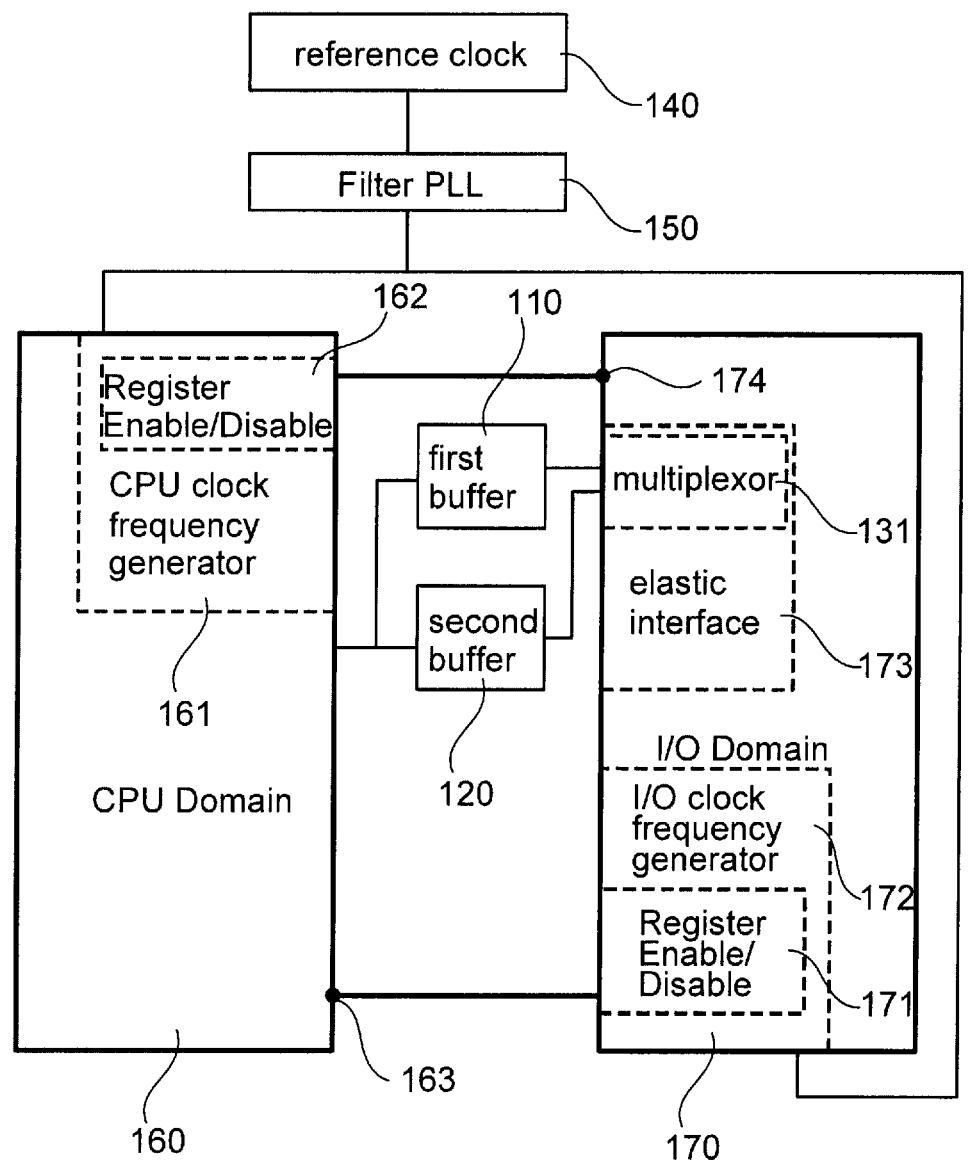
FIG. 7 is a block diagram of a CPU domain, I/O domain, reference clock oscillator, and filter phase lock loop (PLL), wherein the first buffer and the second buffer are used for the data transfer from the CPU domain to the I/O domain, in accordance with an embodiment of the present invention.

FIG. 7 illustrates yet another embodiment of the present invention. A first buffer 110 and a second buffer 120 are used for the data transfer from a CPU clock domain 160 to an I/O clock domain 170. The first buffer 110 and the second buffer 120 are connected in parallel to each other and in series with the CPU clock domain 160 and the I/O clock domain 170. The I/O clock domain includes an elastic interface 173 operable for receiving data from the CPU clock domain and forwarding further into the I/O clock domain. The elastic interface 173 includes the multiplexor 131 connected to the first buffer 110 and the second buffer 120. The multiplexor is operable to forward data from the first buffer 110 or from the second buffer 120 further into the elastic interface 173. The first buffer 110 has the first delay time for the data transfer from the CPU clock domain 160 to the I/O clock domain 170. The second buffer 120 has the second time delay for the data transfer from the CPU clock domain 160 to the I/O clock domain 170. The second delay time is longer than the first delay time.

The CPU domain 160 includes a CPU clock frequency generator 161 of a CPU grid signal for a synchronous timing of CPU logic gates. The I/O domain 170 includes an I/O clock frequency generator 172 of an I/O grid signal for the synchronous timing of I/O logic gates. The I/O clock frequency generator uses a signal of a reference clock oscillator 140 filtered by a filter phase lock loop (PLL) 150 for a generation of the I/O grid signal of a fixed frequency. The CPU clock frequency generator uses the signal of the reference clock oscillator 140 filtered by the filter phase lock look (PLL) 150 for the generation of the CPU grid signal of a variable frequency not exceeding the fixed frequency. A CPU clock register 162 is connected to an I/O grid signal output 174. An I/O clock register 171 is connected to a CPU grid signal output 163. The CPU clock frequency generator 161 includes a digital phase lock loop (DPLL) having the CPU clock register 162 for switching on/off the I/O grid signal used as DPLL feedback signal for a frequency and phase synchronization with the I/O clock domain 170. The I/O clock frequency generator 172 includes a tank PLL having the I/O clock register 171 for switching on/off the CPU grid signal used as a tank PLL feedback signal for the frequency and phase synchronization with the CPU clock domain 160.

The synchronous mode of operation of the I/O clock domain and the CPU clock domain is characterized by: the I/O grid signal and the CPU grid signal having the same fixed frequency, switching on the DPLL feedback signal in the CPU clock frequency generator 161, switching on the tank PLL feedback signal in the I/O clock frequency generator 172, the multiplexor 131 forwarding the data from the first buffer 110 further into the elastic interface 173.

The asynchronous mode of operation of the I/O clock domain and the CPU clock domain is characterized by: the CPU grid signal having the variable frequency lower than the fixed frequency, switching off the DPLL feedback signal in the CPU clock frequency generator 161, switching off the tank PLL feedback signal in the I/O clock frequency generator 172, the multiplexor 131 forwarding the data from the second buffer 120 further into the elastic interface 173.

Figure 8:
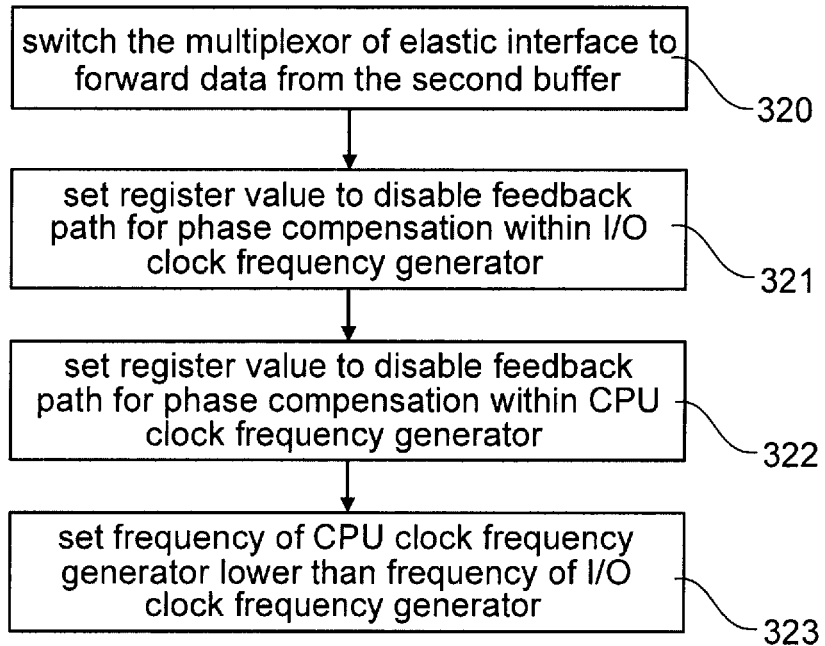
FIG. 8 is a flowchart of the operations for a sync-async transition, in accordance with an embodiment of the present invention.

FIG. 8 is a flow chart of operations 320, 321, 322, 323 for the sync-async transition. An operation 320 of switching of multiplexor 131 of the elastic interface 173 to forward the data from the second buffer 120 is executed by a firmware of the computer system by sending a first multiplexor command to the I/O clock domain 170 to switch the multiplexor 131 for forwarding the data from the second buffer 120 further into the elastic interface 173. An operation 321 of setting a register value to disable a feedback path for a phase compensation within the I/O clock frequency generator 170 is executed by the firmware, wherein the firmware sends a switch off I/O domain synchronization command to the I/O clock domain 170. An operation 322 of setting a register value to disable a feedback path for the phase compensation within the CPU clock frequency generator 161 is executed by the firmware, wherein the firmware sends a switch off CPU domain synchronization command to the CPU clock domain 160. An operation 323 of setting frequency of the CPU clock frequency generator 161 lower than frequency of the I/O clock frequency generator 172 is executed by the firmware, wherein the firmware sends a set CPU frequency to a clock frequency value command to the CPU clock domain 160, wherein the clock frequency value is lower than the fixed frequency.

Those skilled in the art will clearly understand that the sequence of an execution of the operations 321 and 322 is not a principle. The operation 322 can be executed prior the operation 321 or simultaneously with the operation 321.

Figure 9:
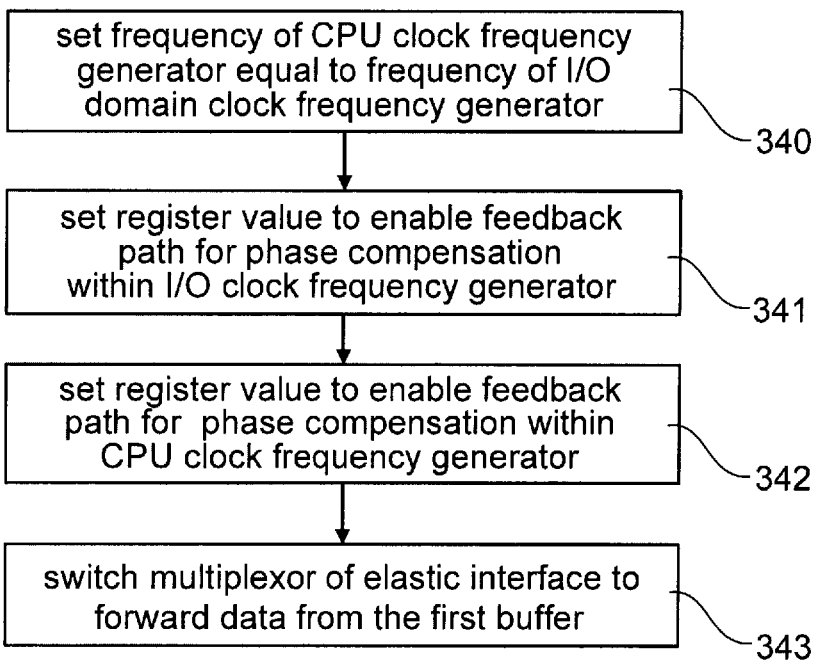
FIG. 9 is a flowchart of the operations for an async-sync transition, in accordance with an embodiment of the present invention.

FIG. 9 is a flow chart of operations 340, 341, 342, 323 for the async-sync transition. An operation 340 of setting frequency of the CPU clock frequency generator 161 equal to frequency of the I/O clock frequency generator 172 is executed by the firmware, wherein the firmware sends the set CPU frequency to the clock frequency value command to the CPU clock domain 160, wherein the clock frequency value is equal to the fixed frequency. An operation 341 of setting a register value to enable feedback path for the phase compensation within the I/O clock frequency generator 170 is executed by the firmware, wherein the firmware sends a switch on I/O domain synchronization command to the I/O clock domain 170. An operation 342 of setting a register value to enable feedback path for the phase compensation within the CPU clock frequency generator 161 is executed by the firmware, wherein the firmware sends a switch on CPU domain synchronization command to the CPU clock domain 160. An operation 343 of switching of multiplexor 131 of the elastic interface 173 to forward the data from the first buffer 110 is executed by a firmware, wherein the firmware sends a second multiplexor command to the I/O clock domain 170 to switch the multiplexor 131 for forwarding the data from the first buffer 110 further into the elastic interface 173.

Those skilled in the art will clearly understand that the sequence of an execution of the operations 341 and 342 is not a principle. The operation 342 can be executed prior the operation 341 or simultaneously with the operation 341.

One embodiment provides a method of data transfer from a first clock domain to a second clock domain. The second clock domain has a fixed clock frequency. The first clock domain has a variable clock frequency not exceeding the fixed clock frequency of the second clock domain. The first clock domain and the second clock domain can be operated in a synchronous mode and in an asynchronous mode. In the synchronous mode the fixed clock frequency of the second clock domain is equal to the variable clock frequency of the first clock domain. In the asynchronous mode the variable frequency of the first clock domain is lower than the fixed frequency of the second clock domain.

A first buffer and a second buffer are used for a data transfer from the first clock domain to the second clock domain. The first buffer and the second buffer are connected in parallel to each other and in series with the first clock domain and the second clock domain. The second clock domain comprises a multiplexor connected to the first buffer and the second buffer. The multiplexor is operable to forward data from the first buffer or from the second buffer further into the second clock domain. The first buffer has a first delay time for data transfer from the first clock domain to the second clock domain. The second buffer has a second time delay for the data transfer from the first clock domain to the second clock domain. The second delay time is longer than the first delay time.

The multiplexor forwards data from the first buffer further into the second clock domain in the synchronous mode of operation and from the second buffer into the second clock domain the asynchronous mode of operation.

The multiplexor can have a mux input port for receiving a first mux command to forward the data from the first buffer further into the second clock domain and a second mux command to forward the data from the second buffer further into the second clock domain. The first clock domain can include a first plurality of logic devices for generating the variable clock frequency and a frequency synchronization with the fixed clock frequency in the synchronous mode. The first plurality of logic devices can include a first sync on/off input port for receiving a first sync on command to switch on the frequency synchronization with the fixed clock frequency and a first sync off command to switch off the frequency synchronization with the fixed clock frequency. The first plurality of logic devices can further include a set frequency input port for receiving a set frequency command to set the variable frequency to a frequency value. The second clock domain can include a second plurality of logic devices for generating the fixed frequency and the frequency synchronization with the variable clock frequency in the synchronous mode. The second plurality of logic devices can include a second sync on/off input port for receiving a second sync on command for switching on the frequency synchronization with the variable clock frequency and a second sync off command for switching off the frequency synchronization with the variable clock frequency.

A sync-async transition from the synchronous mode to the asynchronous mode can include: switching the multiplexor to forward the data from the second buffer further into the second clock domain, wherein the multiplexor receives the second mux command via the mux input port; switching off the frequency synchronization, wherein the first plurality of logic devices receives the first sync off command via the first sync on/off input port and the second plurality of logic devices receives the second sync off command via the second sync on/off input port; and decreasing the variable clock frequency, wherein the first plurality of logic devices receives the set frequency command via the set frequency input port, wherein the frequency value is lower than the fixed clock frequency.

An async-sync transition from the asynchronous mode to the synchronous mode can include: increasing the variable clock frequency, wherein the first plurality of logic devices receives the set frequency command via the set frequency input port, wherein the frequency value is equal to the fixed frequency; switching on the frequency synchronization, wherein the first plurality of logic devices receives the first sync on command via the first sync on/off input port and the second plurality of logic devices receives the second sync on command via the second sync on/off input port; and switching the multiplexor to forward the data from the first buffer further into the second clock domain, wherein the multiplexor receives the first mux command via the mux input port.

The first clock domain can be a CPU clock domain and the second clock domain can be an I/O clock domain. The first plurality of logic devices can include a digital phase lock loop for generation of the variable clock frequency and the second plurality of logic devices can include a tank phase lock loop for generation of the fixed clock frequency. A type of the first buffer can be but not limited to a first-in first-out type buffer. The type of the second buffer can be but not limited to the first-in first-out type buffer.

Another embodiment provides a computer system including a first clock domain and a second clock domain. The second clock domain has a fixed clock frequency and the first clock domain has a variable clock frequency not exceeding the clock frequency of the second clock domain. The first clock domain and the second clock domain can operate in a synchronous mode when the variable clock frequency is equal to the fixed clock frequency. The first clock domain and the second clock domain can operate in an asynchronous mode when the variable frequency is lower than the fixed frequency. The computer system further includes a first buffer and a second buffer for a data transfer from the first clock domain to the second clock domain. The first buffer has a first delay time for the data transfer from the first clock domain to the second clock domain. The second buffer has a second delay time for the data transfer from the first clock domain to the second clock domain. The second delay time is longer than the first delay time. The first buffer and the second buffer are connected in parallel to each other and in series with the first clock domain and the second clock domain, wherein the first and the second buffers being connected to a multiplexor in the second clock domain. The multiplexor is operable to forward data transferred by the first buffer in the synchronous mode or the data transferred by the second buffer in the asynchronous mode. The first clock domain can be a CPU clock domain and the second clock domain can be an I/O clock domain.

The multiplexor can have a mux input port for receiving a first mux command for forwarding the data from the first buffer further into the second clock domain and a second mux command for forwarding the data from the second buffer further into the second clock domain.

The first clock domain can include a first plurality of logic devices for generating the variable clock frequency and a frequency synchronization with the fixed clock frequency in the synchronous mode. The first plurality of logical devices can include a first sync on/off input port for receiving a first sync on command to switch on the frequency synchronization and a first sync off command to switch off the frequency synchronization. The first plurality of logical devices can further include a set frequency input port to set the variable clock frequency to a frequency value. The first plurality of logical devices can further include a digital phase look loop for generation of the variable clock frequency.

The second clock domain can include a second plurality of logic devices for generating the fixed clock frequency and the frequency synchronization with the variable clock frequency in the synchronous mode. The second plurality of logical devices includes a second sync on/off input port for receiving a second sync on command to switch on the frequency synchronization and a second sync off command to switch off the frequency synchronization. The second plurality of logic devices can further include a tank phase lock loop for generation of the fixed clock frequency.

A type of the first buffer can be but not limited to a first-in first-out type buffer. The type of the second buffer can be but not limited to the first-in first-out type buffer.

What is claimed is:

1. A method of transferring data from a first clock domain to a second clock domain, the method comprising:
    writing the data from the first clock domain into a first buffer for a data transfer from the first clock domain to the second clock domain and into a second buffer for the data transfer from the first clock domain to the second clock domain, wherein the second clock domain has a fixed clock frequency, and the first clock domain has a variable clock frequency not exceeding the clock frequency of the second clock domain, the first clock domain and the second clock domain operate in a synchronous mode when the variable clock frequency is equal to the fixed clock frequency, and the first clock domain and the second clock domain operate in an asynchronous mode when the variable frequency is lower than the fixed frequency, wherein the first buffer has a first time delay for the data transfer from the first clock domain to the second clock domain, wherein the second buffer has a second time delay for the data transfer from the first clock domain to the second clock domain, the second delay time is longer than the first delay time, the first buffer and the second buffer being connected in parallel to each other and in series with the first clock domain and the second clock domain, wherein the first and the second buffers being connected to a multiplexor in the second clock domain;
    forwarding the data from the first buffer via the multiplexor into the second clock domain based on the first clock domain and the second clock domain operating in the synchronous mode; and
    forwarding the data from the second buffer via the multiplexor into the second clock domain based on the first clock domain and the second clock domain operating in the asynchronous mode.

2. The method of claim 1, wherein the multiplexor has a mux input port for receiving a first mux command to forward the data from the first buffer into the second clock domain and a second mux command to forward the data from the second buffer into the second clock domain, wherein the first clock domain comprises a first plurality of logic devices for generating the variable clock frequency and a frequency synchronization with the fixed clock frequency in the synchronous mode, wherein the first plurality of logic devices comprises a first sync on/off input port for receiving a first sync on command to switch on the frequency synchronization with the fixed clock frequency and a first sync off command to switch off the frequency synchronization with the fixed clock frequency, wherein the first plurality of logic devices comprises a set frequency input port for receiving a set frequency command to set the variable frequency to a frequency value, wherein the second clock domain comprises a second plurality of logic devices for generating the fixed frequency and the frequency synchronization with the variable clock frequency in the synchronous mode, wherein the second plurality of logic devices comprises a second sync on/off input port for receiving a second sync on command for switching on the frequency synchronization with the variable clock frequency and a second sync off command for switching off the frequency synchronization with the variable clock frequency, wherein a transition from the synchronous mode to the asynchronous mode comprises:
    switching the multiplexor to forward the data from the second buffer into the second clock domain, wherein the multiplexor receives the second mux command via the mux input port;
    switching off the frequency synchronization, wherein the first plurality of logic devices receives the first sync off command via the first sync on/off input port and the second plurality of logic devices receives the second sync off command via the second sync on/off input port; and
    decreasing the variable clock frequency, wherein the first plurality of logic devices receives the set frequency command via the set frequency input port, wherein the frequency value is lower than the fixed clock frequency.

3. The method of claim 1, wherein the multiplexor has a mux input port for receiving a first mux command to forward the data from the first buffer into the second clock domain and a second mux command to forward the data from the second buffer into the second clock domain, wherein the first clock domain comprises a first plurality of logic devices for generating the variable clock frequency and a frequency synchronization with the fixed clock frequency in the synchronous mode, wherein the first plurality of logic devices comprises a first sync on/off input port for receiving a first sync on command to switch on the frequency synchronization with the fixed clock frequency and a first sync off command to switch off the frequency synchronization with the fixed clock frequency, wherein the first plurality of logic devices comprises a set frequency input port for receiving a set frequency command to set the variable frequency to a frequency value, wherein the second clock domain comprises a second plurality of logic devices for generating the fixed frequency and the frequency synchronization with the variable clock frequency in the synchronous mode, wherein the second plurality of logic devices comprises a second sync on/off input port for receiving a second sync on command for switching on the frequency synchronization with the variable clock frequency and a second sync off command for switching off the frequency synchronization with the variable clock frequency, wherein a transition from the asynchronous mode to the synchronous mode comprises:
    increasing the variable clock frequency, wherein the first plurality of logic devices receives the set frequency command via the set frequency input port, wherein the frequency value is equal to the fixed frequency;
    switching on the frequency synchronization, wherein the first plurality of logic devices receives the first sync on command via the first sync on/off input port and the second plurality of logic devices receives the second sync on command via the second sync on/off input port; and switching the multiplexor to forward the data from the first buffer into the second clock domain, wherein the multiplexor receives the first mux command via the mux input port.

4. The method of claim 1, wherein the first clock domain is a CPU clock domain and the second clock domain is an I/O clock domain.

5. The method of claim 3, wherein the first plurality of logic devices comprises a digital phase lock loop for generation of the variable clock frequency and the second plurality of logic devices comprises a tank phase lock loop for generation of the fixed clock frequency.

6. The method of claim 1, wherein the first buffer and the second buffer are a first-in first-out type buffers.

7. A computer system comprising:
a first clock domain and a second clock domain, wherein the second clock domain has a fixed clock frequency, the first clock domain has a variable clock frequency not exceeding the clock frequency of the second clock domain, the first clock domain and the second clock domain operating in a synchronous mode when the variable clock frequency is equal to the fixed clock frequency, the first clock domain and the second clock domain operating in an asynchronous mode when the variable frequency is lower than the fixed frequency;
a first buffer and a second buffer for a data transfer from the first clock domain to the second clock domain, the first buffer having a first delay time for the data transfer from the first clock domain to the second clock domain, the second buffer having a second delay time for the data transfer from the first clock domain to the second clock domain, the second delay time being longer than the first delay time, the first buffer and the second buffer being connected in parallel to each other and in series with the first clock domain and the second clock domain, wherein the first buffer and the second buffer are connected to a multiplexor in the second clock domain, said multiplexor forwarding data transferred by the first buffer in the synchronous mode or the data transferred by the second buffer in the asynchronous mode.

8. The computer system of claim 7, wherein the multiplexor has a mux input port for receiving a first mux command for forwarding the data from the first buffer into the second clock domain and a second mux command for forwarding the data from the second buffer into the second clock domain.

9. The computer system of claim 7, wherein:
the first clock domain comprises a first plurality of logic devices for generating the variable clock frequency and a frequency synchronization with the fixed clock frequency in the synchronous mode; and
the first plurality of logical devices comprises a first sync on/off input port for receiving a first sync on command to switch on the frequency synchronization and a first sync off command to switch off the frequency synchronization, the first plurality of logical devices comprises a set frequency input port to set the variable clock frequency to a frequency value.

10. The computer system of claim 9, wherein the first plurality of logic devices comprises a digital phase look loop for generation of the variable clock frequency.

11. The computer system of claim 7, wherein:
the second clock domain comprises a second plurality of logic devices for generating the fixed clock frequency and a frequency synchronization with the variable clock frequency in the synchronous mode; and
the second plurality of logical devices comprises a second sync on/off input port for receiving a second sync on command to switch on the frequency synchronization and a second sync off command to switch off the frequency synchronization.

12. The computer system of claim 11, wherein the second plurality of logic devices comprises a tank phase lock loop for generation of the fixed clock frequency.

13. The computer system of claim 7, wherein the first clock domain is a CPU clock domain and the second clock domain is an I/O clock domain.

14. The computer system of claim 7, wherein the first buffer is a first-in first-out type buffer.

15. The computer system of claim 7, wherein the second buffer is a first-in first-out type buffer.

16. A computer program product for transferring data from a first clock domain to a second clock domain, the computer program product comprising:
a non-transitory computer readable storage medium readable by a processing circuit and storing instructions for execution by the processing circuit for performing a method comprising:
writing the data from the first clock domain into a first buffer for a data transfer from the first clock domain to the second clock domain and into a second buffer for the data transfer from the first clock domain to the second clock domain, wherein the second clock domain has a fixed clock frequency, and the first clock domain has a variable clock frequency not exceeding the clock frequency of the second clock domain, the first clock domain and the second clock domain operate in a synchronous mode when the variable clock frequency is equal to the fixed clock frequency, and the first clock domain and the second clock domain operate in an asynchronous mode when the variable frequency is lower than the fixed frequency, wherein the first buffer has a first time delay for the data transfer from the first clock domain to the second clock domain, wherein the second buffer has a second time delay for the data transfer from the first clock domain to the second clock domain, the second delay time is longer than the first delay time, the first buffer and the second buffer being connected in parallel to each other and in series with the first clock domain and the second clock domain, wherein the first and the second buffers being connected to a multiplexor in the second clock domain;
forwarding the data from the first buffer via the multiplexor into the second clock domain based on the first clock domain and the second clock domain operating in the synchronous mode; and
forwarding the data from the second buffer via the multiplexor into the second clock domain based on the first clock domain and the second clock domain operating in the asynchronous mode.

17. The computer program product of claim 16, wherein the multiplexor has a mux input port for receiving a first mux command to forward the data from the first buffer into the second clock domain and a second mux command to forward the data from the second buffer into the second clock domain, wherein the first clock domain comprises a first plurality of logic devices for generating the variable clock frequency and a frequency synchronization with the fixed clock frequency in the synchronous mode, wherein the first plurality of logic devices comprises a first sync on/off input port for receiving a first sync on command to switch on the frequency synchronization with the fixed clock frequency and a first sync off command to switch off the frequency synchronization with the fixed clock frequency, wherein the first plurality of logic devices comprises a set frequency input port for receiving a set frequency command to set the variable frequency to a frequency value, wherein the second clock domain comprises a second plurality of logic devices for generating the fixed frequency and the frequency synchronization with the variable clock frequency in the synchronous mode, wherein the second plurality of logic devices comprises a second sync on/off input port for receiving a second sync on command for switching on the frequency synchronization with the variable clock frequency and a second sync off command for switching off the frequency synchronization with the variable clock frequency, wherein a transition from the synchronous mode to the asynchronous mode comprises:

switching the multiplexor to forward the data from the second buffer into the second clock domain, wherein the multiplexor receives the second mux command via the mux input port;

switching off the frequency synchronization, wherein the first plurality of logic devices receives the first sync off command via the first sync on/off input port and the second plurality of logic devices receives the second sync off command via the second sync on/off input port; and decreasing the variable clock frequency, wherein the first plurality of logic devices receives the set frequency command via the set frequency input port, wherein the frequency value is lower than the fixed clock frequency.

18. The computer program product of claim 16, wherein the multiplexor has a mux input port for receiving a first mux command to forward the data from the first buffer into the second clock domain and a second mux command to forward the data from the second buffer into the second clock domain, wherein the first clock domain comprises a first plurality of logic devices for generating the variable clock frequency and a frequency synchronization with the fixed clock frequency in the synchronous mode, wherein the first plurality of logic devices comprises a first sync on/off input port for receiving a first sync on command to switch on the frequency synchronization with the fixed clock frequency and a first sync off command to switch off the frequency synchronization with the fixed clock frequency, wherein the first plurality of logic devices comprises a set frequency input port for receiving a set frequency command to set the variable frequency to a frequency value, wherein the second clock domain comprises a second plurality of logic devices for generating the fixed frequency and the frequency synchronization with the variable clock frequency in the synchronous mode, wherein the second plurality of logic devices comprises a second sync on/off input port for receiving a second sync on command for switching on the frequency synchronization with the variable clock frequency and a second sync off command for switching off the frequency synchronization with the variable clock frequency, wherein a transition from the asynchronous mode to the synchronous mode comprises:

increasing the variable clock frequency, wherein the first plurality of logic devices receives the set frequency command via the set frequency input port, wherein the frequency value is equal to the fixed frequency;

switching on the frequency synchronization, wherein the first plurality of logic devices receives the first sync on command via the first sync on/off input port and the second plurality of logic devices receives the second sync on command via the second sync on/off input port; and switching the multiplexor to forward the data from the first buffer into the second clock domain, wherein the multiplexor receives the first mux command via the mux input port.

19. The computer program product of claim 16, wherein the first clock domain is a CPU clock domain and the second clock domain is an I/O clock domain.

20. The computer program product of claim 18, wherein the first plurality of logic devices comprises a digital phase lock loop for generation of the variable clock frequency and the second plurality of logic devices comprises a tank phase lock loop for generation of the fixed clock frequency.

\* \* \* \* \*